Nov. 14, 1950  V. PETERS  2,529,812
METHOD AND APPARATUS FOR ARC WELDING
Filed June 5, 1948
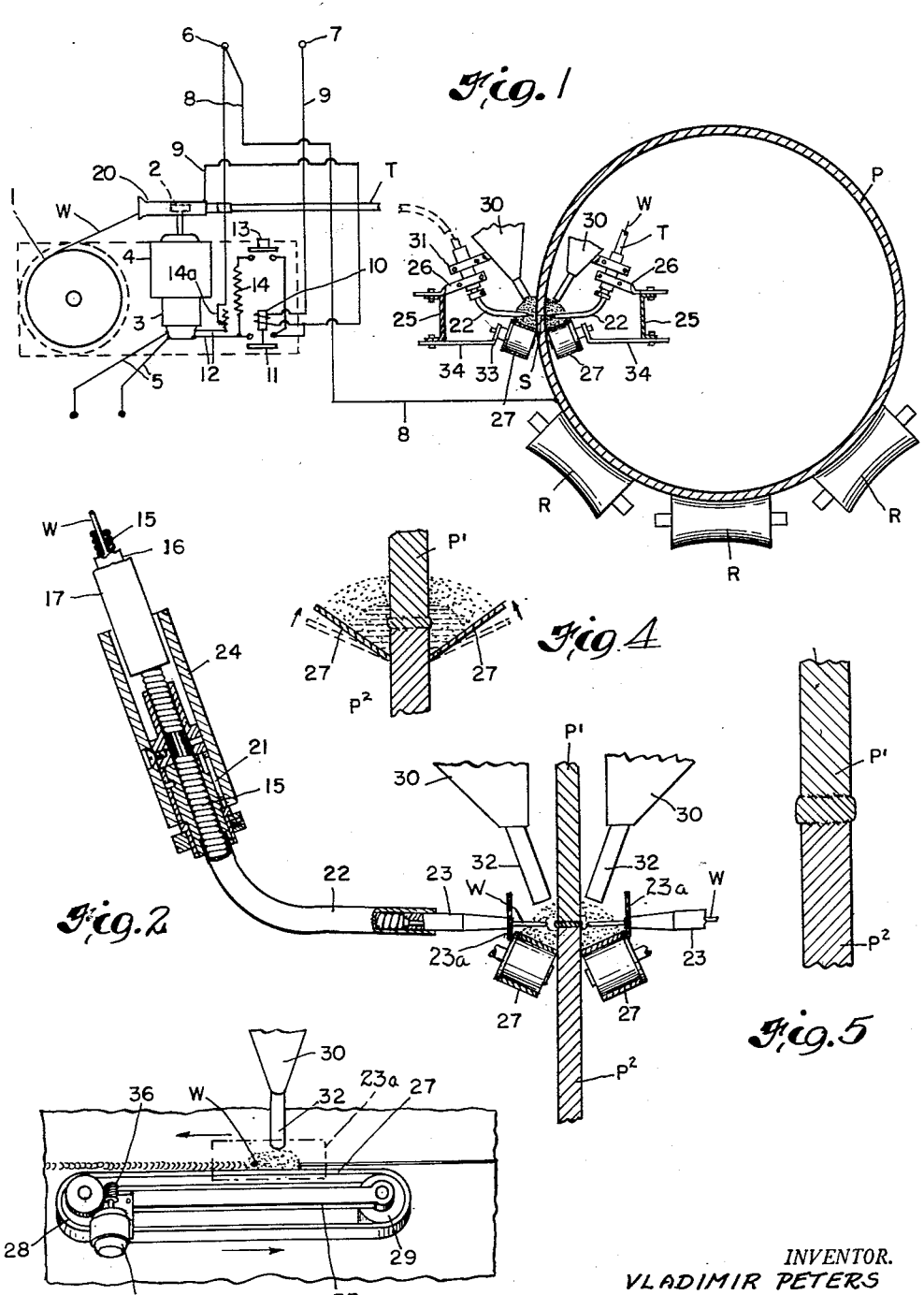
INVENTOR.
VLADIMIR PETERS
BY
Oberlin & Limbach
ATTORNEYS.

Patented Nov. 14, 1950

2,529,812

UNITED STATES PATENT OFFICE 2,529,812

METHOD OF AND APPARATUS FOR ARC WELDING

Vladimir Peters, Lakewood, Ohio, assignor to The Lincoln Electric Company, Cleveland, Ohio, a corporation of Ohio Application June 5, 1948, Serial No. 31,314

18 Claims. (Cl. 219—10)

The present improvements, relating as indicated to arc welding, have more particular regard to method of arc welding and apparatus for use in connection therein, in which a metallic electrode or weld rod of indefinite length is employed, such rod or wire being supplied to the point where the arc is struck and the end thereof being melted off incidentally to the welding operation. However, as will appear, my invention in its process aspect also includes the use of a carbon arc in which instead of metallic electrodes carbon electrodes are employed to strike the arc.

In such broader aspect the present invention comprises the welding of the juxtaposed edges of a metallic work-piece by traversing such edges with two arcs, one on each side of the seam to be welded, which arcs are substantially opposed to each other. In utilizing the foregoing novel procedure I have further found it desirable, although not essential to dispose the edges of the work-pieces, which are to be welded, in an approximately horizontal line one above the other, so that such arcs are directed thereagainst not only from opposite sides of the seam to be welded but approximately in a horizontal plane at right angles to the vertical plane in which the juxtaposed edges of the work-piece lie.

As a result of the foregoing I have found it possible to do away entirely with so-called backing strips and for the necessity inherent in present methods of arc welding of repositioning the work-piece where the seam is welded first on one side and then on the other. In other words, by utilizing two arcs in the manner in question, the seam is welded simultaneously on both sides and accordingly a finished weld produced in a single pass, with great economy of time and expense. At the same time a uniformly perfect weld is obtained.

To the accomplishment of the foregoing and related ends, said invention, then, consists of the steps and means hereinafter fully described and particularly pointed out in the claims, the annexed drawing and the following description setting forth in detail certain means and one mode of carrying out the invention, such disclosed means and mode illustrating, however, but one of various ways in which the principle of the invention may be used.

In said annexed drawing:

Fig. 1 is a more or less diagrammatic representation of one form of apparatus for carrying out my improved method, such apparatus being shown as applied to the welding of the seam between the juxtaposed edges of a preformed pipe or tube;

Fig. 2 is a similar view of a portion of such apparatus but on a larger scale and with certain parts shown in section;

Fig. 3 is an elevation of the apparatus illustrated in Fig. 2 as viewed from one side;

Fig. 4 is a view similar to that of Fig. 2 showing a modification in detail; and Fig. 5 is a sectional view of a completed weld made in accordance with my improved method and apparatus.

The specific welding apparatus illustrated in the several figures in the drawing forms no part of the present invention, such apparatus being designed to feed a small diameter weld rod or wire of indefinite length and supply thereto an arc welding current of such amperage as to provide a current density of at least 60,000 amperes per square inch of normal electrode-cross-section. Such current density is effective substantially instantaneously to melt off the end of such electrode when the latter is brought into contact with the work-piece and establish an arc between such end and work-piece, and the electrode is thereupon continuously fed to the latter at a rapid rate effective to maintain such arc therebetween.

Referring specifically to Fig. 1, as previously noted, the apparatus there shown is designed to weld the juxtaposed edges of a preformed pipe or tube P. The latter is supported for longitudinal movement in an axial direction on rollers R or equivalent means, and is thus supported so that the edges which enter into the seam S are disposed in a substantially vertical plane one above the other, in contradistinction to present methods of arc welding in which such edges are brought together in a substantially horizontal plane and the welding done on a vertical plane.

Furthermore, as also previously noted, two arcs are employed, one on each side of the seam to be welded, and substantially directly opposite each other.

In the specific apparatus thus illustrated for providing such welding arcs, only that designed to operate on the outer side of the seam S to be welded is completely shown. The one which is designed to operate on the inside, being a substantial duplicate of the other, is shown in part only. Referring to the apparatus thus fully (although only diagrammatically) shown, that lying to the left of the pipe P in Fig. 1, the weld rod or wire W is drawn from a reel 1 by means of gripping rolls 2 (only one appearing in the figure) in conventional manner. The weld rod employed will desirably be of relatively small diameter, e. g. $\frac{1}{16}$ inch to $\frac{5}{64}$ inch, and comparatively high rates of feed are required, e. g. approximately 300 inches per minute for such $\frac{1}{16}$ D. wire and only slightly less for the $\frac{5}{64}$ D. wire. Gripping rolls 2 are driven by motor 3 through a reduction and change speed gear box 4, whereby the rate of feed of the weld rod or wire W may be set, as indicated, for each of the several sizes or diameters of wire with which the apparatus is designed to be employed.

Current is supplied to the field of motor 3 through leads 5, from a source of current independent of the welding current, e. g. from an ordinary 120 v. power line. The welding current may likewise be taken from any suitable source, e. g. from the terminals 6 and 7 of a welding machine (not shown) which will be provided with the usual means for varying the voltage and amperage of the current as may be found desirable for any particular operation. However, it will not ordinarily be necessary to make any changes in the setting of the machine, or in other words, of the welding current, during the welding operation, or in fact for any given set-up, i. e. any operation in which it has been determined at what rate the weld rod or wire is to be fed to the work and the current appropriate for such particular operation has been selected.

One of the aforesaid terminals, preferably the negative terminal 6, where direct current is being used, is connected by means of a lead 8 with the work-piece, which in the case in hand is the pipe P. The other, positive, terminal 7 is connected by means of a lead 9 with the conductor which forms a part of the flexible tubular guide T through which the wire W is fed to the seam to be welded.

Operation of the motor 3 is tied in with the welding operation by a series relay 10, which is operated by the welding current through the electrode lead 9 to close a switch 11 in one of the armature leads 12. In addition to this relay, there is included in such armature lead a push button switch 13 which is adapted to connect the latter through a resistor 14. This last mentioned switch is used to operate the motor to feed the wire manually when not welding, for example in initially threading the wire through the tubular guide T. An adjustable resistor 14a will also be desirably included in the other such armature lead 12, to permit the armature current to be set as desired.

The construction of the flexible tubular guide T is best illustrated in Fig. 2 where the one end thereof through which the electrode or wire W is fed to the arcing point is shown in section. The main guide element or liner 15, through which the weld rod or wire W directly passes when being fed to the work, consists of a flexible coil of hardened steel wire or equivalent wear-resisting material, the coils of which closely contact so as to maintain the two walls closed despite any bending to which the tube may be subjected. Immediately surrounding, and in close electrical as well as physical contact with such inner tube 15, is a conductor sheathe 16 formed of multi-stranded fine copper wire assembled and twisted about said inner tube, much as are the component strands in a wire cable. Conductor 16 is in turn surrounded with a heavy sheathe 17 of rubber or equivalent flexible insulating material.

It will be understood that the guide T may consist of a single length constructed as just described or of several sections, which are provided at their ends with suitable coupling means. The end of the guide which is designed to receive the wire W as fed by rolls 2 will be provided with a bell-mouth fitting 20, and lead 9, after passing through relay 10, will be appropriately connected at the same end of guide T with conductor 16 therein. At its opposite end said guide is provided with a fitting, likewise best shown in Fig. 2, through and from which the wire is discharged to the point where the arc is struck. This terminal fitting comprises a core 21 that carries a curved tube 22 provided at its outer end with a conical extension 23. The manner in which such terminal fitting is coupled to the adjacent end of flexible guide T requires no detailed description except to note that such coupling includes an insulating shell 24 which serves the dual purpose of further insuring against contact with the charged conductor 16 and as a means for supporting the terminal fitting in proper relation to the work-piece.

The flexible coil 15, or an extension thereof, serves as the wire guiding means up to such extension 23 and the latter with the curved tube 22 are electrically connected with the conductor sheathe 16. No special provision for effecting electrical contact between the wire being fed through the tube and such terminal fitting has been found necessary, since such wire as drawn from the reel and fed through the guide will necessarily undulate sufficiently to press against the bore in the fitting at a sufficient number of points to insure the free flow of current to the portion of the wire that projects beyond the terminal fitting. At the same time, due to the reversely bent form of the tube 22, the latter serves to straighten the wire as it emerges therefrom.

Various means may be provided in order to support the terminal fitting 22 of guide T in proper relation to the seam to be welded. As illustrated in Fig. 1, a longitudinal beam 25 is utilized, being particularly suitable for thus supporting the device which operates from within the pipe P since such beam may be attached at one end and freely extend within the pipe with the device mounted on its free end. Accordingly, with the two welding devices positioned opposite each other the pipe may be moved longitudinally of its axis so as to effect relative traversing movement of the juxtaposed edges, which enter into the seam to be welded, past the oppositely directed fittings 22 from which the welding electrodes or wire are discharged. The respective welding devices may be adjustably secured to the corresponding supports 25 by means of clamps 26 so that the welding electrode or wire as it emerges from each will be properly located with respect to the seam to be welded. Any suitable means for effecting such traversing movement may be employed, the only requirement being that the movement be at a steady uniform rate, where, as in the case in hand, the seam to be welded is uniform in character throughout its length.

Associated with each welding device are means for supporting a layer of powdered or granular fluxing material which in the case where a metallic weld rod or electrode is used will desirably be provided in order more or less to submerge the arc struck between the respective wires and the work-piece edges. In the form illustrated each such means comprises an endless belt 27, best shown in the side elevational view of Fig. 3, such belt passing around pulleys 28 and 29 that are inclined at such an angle to the work-piece (see Figs. 1 and 2) as to provide an open through-like support for such flux. The latter may be supplied in any suitable way, as by means of a funnel-like hopper 30, either at or just ahead of the point where the arc is struck so as to deposit a layer of such depth as may be found desirable. Each such hopper may be adjustably attached to the corresponding terminal fitting by a clamp 31 so that the position of the discharge tube 32 leading therefrom will determine the depth of the deposited flux layer.

In order to prevent the flux from spilling over the outer edge of the belt, each of the nozzles 23 of the respective terminal fittings 22 may have attached thereto a guard in the form of a plate 23a, as shown in section in Fig. 2 and in dotted outline in Fig. 3. This plate should closely contact such belt edge and extend a sufficient distance therealong to accomplish the stated purpose.

The pulleys 28 and 29 about which belt 27 travels are shown as being supported by a bar 33 which is in turn supported by a bracket 34 from the beam 25 to which the corresponding welding device is attached. Any suitable means may be employed to drive the belt. Thus as illustrated an electric motor 35, carried by bar 33, may be directly connected as by means of worm gearing 36 with the one pulley so as to drive the same in the proper direction to cause the upper run of the belt to travel in the same direction and at the same rate of speed as the work-piece. Accordingly, despite the fact that this belt run should rather closely contact the corresponding surface of the work-piece, there will be no slippage between the two and such portion of the flux as may be reduced to molten state by the intense heat of the arc will be kept from escaping. The flux retaining member which the upper run of the belt thus constitutes should extend for a sufficient distance beyond the point where the arc is established so that such molten flux will have time to solidify before it reaches the end of the run. It is a matter of indifference whether such fused flux remains adherent to the welded seam beyond this point. If it is of such character as to freely break away, it will be discharged by the belt along with the unfused flux. The belt of course will be made of asbestos or other heat resistant material.

While in Figs. 1, 2 and 3 the axes of the pulleys 28 and 29 which support the belt are shown as inclined at the same angle, in certain cases it may be found desirable to incline the axis of the one pulley at a greater angle than the other. The effect of such arrangement is diagrammatically illustrated in Fig. 4 where the belt is shown in dotted section at the same angle as illustrated in the preceding figures, and in full lines at a more sharply inclined angle as would be the result if the axis of the terminal pulley were thus inclined. The result of such an arrangement will be to press or squeeze the deposited layer of flux against the welded seam and thus modify the form of the exposed surface of the seam or bead.

The sectional view, Fig. 5, of a finished weld illustrates the uniform character of the bead which may be thus simultaneously formed on each side of the seam using my improved method and apparatus. As also shown in the same figure, complete interfusion of the metal deposited from each side of the seam results, so that the weld presents a novel and distinctive appearance when compared with the overlapping welds formed by laying down a seam first on one side and then on the other as in conventional welding practice. The weld thus produced by the present method is also distinguished from those formed by a single pass as in welding light gauge material since the use of a backing strip is eliminated and this always introduces some differences between the front and back of the welded seam. Another difference, which is quite important particularly in large scale operations, is that by the present improved method a perfect weld may be effected from the very begining to the very end of the seam, thus avoiding the necessity of repairing or cutting off and discarding the ends of the welded parts. To illustrate the advantages of the present process over conventional welding with two passes, the following is a direct comparison in the welding of quarter inch preformed steel pipe, 31 feet in length. Using opposite arcs, as illustrated in Fig. 1, with $5/64$ inch metal electrode or wire and operating with a total current of 780 amperes at 32–33 volts, the average time to complete the welding of a pipe of the length stated has been 7.08 minutes, i. e. at a rate of 52.5 inches per minute. In comparison with the foregoing, welding first an outside pass using $3/16$ inch weld rod or wire and then an inside pass likewise using $3/16$ inch weld rod or wire, with a total current of 3225 amperes at 36 volts, the actual welding time required to complete both passes was 9.14 minutes, i. e. at a rate of 40.7 inches per minute. This does not take into account the time required to handle the pipe between the two passes or reset the welding equipment for the second operation. Furthermore, as previously noted, in the case of such conventional two pass method of welding each end of the pipe has to be repaired, which requires additional time.

In addition, a consequential saving in material is effected in that only 2.56 pounds of electrode wire and 2.77 pounds of flux are required in welding such pipe length by the present process, as against 8.44 pounds of wire and 11.03 pounds of flux in such two-pass operation.

It will be understood that the use of my improved process is not limited to the employment of the particular welding device hereinbefore described, nor even to the use of metallic weld rod or wire. In other words, not only may other well known types of automatic welding equipment using metallic weld rod or wire be employed with satisfactory results; but carbon arcs similarly opposed so as simultaneously to weld the juxtaposed edges of the work-piece from opposite sides may likewise be utilized, particularly if means be provided to press the juxtaposed edges of the work-piece together as the welding proceeds. It will also be understood that while in the foregoing description particular reference has been made to the use of my improved method and apparatus in the welding of preformed pipe, the similarly arranged, juxtaposed edges of any other work-piece, e. g. a field storage tank, may be welded just as efficaciously. Thus in Fig. 2, while the parts $P^1$ and $P^2$ there appearing may be regarded as the opposed portions of a circular work-piece such as the pipe P, they may be just as well regarded as two separate pieces of flat or other shape, so long as their juxtaposed edges are placed in approximately horizontal position. It will accordingly be understood that the term "work-piece" as used herein and in the following claims is intended to connote either a single piece, as in the case of a length of pipe, or two separate pieces.

It will also be understood that while I have described the operation of welding pipe as applied to preformed lengths, the present process and apparatus are admirably suited for welding the longitudinal seam of a pipe or tube of indefinite length incidentally to the operation of forming the same from flat strip or plate. Such process and apparatus may also be readily adapted to the welding of the circumferential, or "girth" seam between juxtaposed ends of two pipe lengths. In such case, the two opposed arcs will be applied to such seam in substantially the same relation, i. e. "9 o'clock" or "3 o'clock," to the circle defined thereby as shown in Fig. 1. However, the pipe will be rotated about its axis, instead of being moved longitudinally, and relatively stationary, box-like containers, instead of travelling belts, will hold the flux.

Finally, while the welding devices have been shown and described as arranged to feed the two weld rods, i. e. provide the two welding arcs, directly opposite each other, the one may be located slightly in advance of the other along the seam to be welded. So long as the metal that is fused by the first arc is still in molten state when the metal from the second is interfused therewith, a satisfactory weld is produced. Depending upon conditions, for example the amount of flux cover employed, the one arc may follow the other by as much as several inches, and the term "opposite" as used herein to describe the arcs is to be interpreted in this sense.

As indicated, the layer of flux deposited along the seam incidentally to the welding operation may serve to prevent too rapid dissipation of heat and resulting solidification of the seam. However, particularly where as illustrated in Fig. 4 such layer of flux is subjected to varying lateral pressure, it serves the further important function of forming the bead. In other words, such flux layer, or the portion thereof which is reduced to molten state by the heat of the arc, acts as a retaining dam for the fused metal that enters into the seam being welded. Not only is such metal thus held in place between the juxtaposed edges of the work-piece, but by pressing laterally against such molten flux the metal can in turn be moved sufficiently to change the bead shape as desired.

It is also possible to displace the interfused metal laterally of the seam by varying the arc intensity on the opposite sides of the latter. Thus such metal may be pushed in one direction or the other so as to leave a flush bead on either side as desired. In place of using a powdered or granular flux, a gaseous protective medium may be directly supplied so as to surround the arcs on the respective sides of the seam being welded. The use of helium and similar gases for the purpose stated is well understood and it has therefore been deemed unnecessary to illustrate the application thereof to the present process and apparatus.

It has not been deemed necessary to separately illustrate the use of carbon arcs in place of metallic arcs in carrying out the present improved process, inasmuch as carbon electrodes would simply be substituted for the metallic electrodes or wires illustrated in the several figures of the drawing, with conventional devices for holding and feeding such carbon electrodes. It is also possible thus to substitute such a carbon electrode on only one side of the seam that is being welded while using the metallic electrode on the other. Moreover, the present process is not limited to the use of a single electrode, either carbon or metal, on the respective sides of the seam, but two or more electrodes, either metallic or carbon, may be used, one after the other, to traverse the respective sides of the seam, as in the method of electric welding disclosed in Patent No. 2,320,824 to G. G. Landis et al., dated June 1, 1943. Accordingly, where, as in the claims which follow, reference is made to two electric arcs, one on each side of the seam, no limitation is implied to the use of a single arc on each such side.

Other modes of applying the principle of my invention may be employed instead of the one explained, change being made as regards the means and the steps herein disclosed, provided those stated by any of the following claims or their equivalent be employed.

I therefore particularly point out and distinctly claim as my invention:

1. In a method of forming a welded seam confined between two juxtaposed metallic work-piece edges, the steps which consist in simultaneously traversing the line of juncture between such edges with two electric arcs, one on each side of the seam to be formed and substantially opposite to each other, and providing metal to form the seam simultaneously from opposite sides thereof and in amount approximately sufficient to fill the space between such edges, such arcs being respectively capable of fusing such seam to more than half the depth thereof, whereby a common pool of molten metal is formed by their conjoint action.

2. In a method of forming a welded seam confined between two juxtaposed metallic work-piece edges, the step which consists in simultaneously traversing the line of juncture between such edges with two electric arcs struck from continuously fed metallic electrodes, one on each side of the seam to be formed and substantially opposite to each other, such arcs being respectively capable of fusing such seam to more than half the depth thereof said electrodes providing approximately sufficient metal to fill the space between such edges and said arcs interfusing such metal to form a common molten pool therebetween.

3. In mechanism for arc welding a seam confined between two juxtaposed metallic work-piece edges, the combination with a work-piece support adapted to maintain such edges in approximately horizontal position, one above the other, of two devices, one on each side of the seam to be welded, for continuously feeding metallic electrodes towards such seam, said devices being mounted for conjoint movement relatively to and longitudinally of such seam, and a member mounted for movement conjointly with each of said devices and adapted to carry a layer of flux sufficient to cover the corresponding side of such seam.

4. In mechanism for arc welding a seam confined between two juxtaposed metallic work-piece edges, the combination with a work-piece support adapted to maintain such edges one above the other, said support permitting movement of the work-piece in a direction longitudinally of the seam to be welded, two devices, one on each side of such seam, for continuously feeding metallic electrode towards such seam, said devices being mounted for conjoint movement relatively to and longitudinally of such seam, and a member mounted for movement conjointly with each of said devices and adapted to carry a layer of flux sufficient to cover the corresponding side of such seam, said member traveling in unison with the movement of the latter past said devices.

5. In mechanism for arc welding a seam confined between two juxtaposed work-piece edges maintained in approximately horizontal position, one above the other, the combination of a device for continuously feeding metallic electrode towards the seam to be welded from one side thereof said device being mounted for movement relatively to and longitudinally of such seam, and an elongated traveling member mounted for movement conjointly with said device and extending longitudinally of such seam, said member having one edge disposed to contact the work-piece below such seam and being adapted to carry a layer of flux in covering contact with the corresponding side of such seam.

6. In mechanism for arc welding a seam confined between two juxtaposed work-piece edges maintained in approximately horizontal position, one above the other, the combination of means adapted to move said work-piece in a direction longitudinally of the seam to be welded, a device for continuously feeding metallic electrode towards such seam from one side thereof, and a belt having one edge disposed to contact the work-piece below such seam adjacent said device, said belt traveling in unison with said work-piece and being adapted to carry a layer of flux sufficient to cover the corresponding side of such seam.

7. In mechanism for arc welding a seam confined between two juxtaposed work-piece edges maintained in approximately horizontal position, one above the other, the combination of means adapted to move said work-piece in a direction longitudinally of the seam to be welded, a device for continuously feeding metallic electrode towards such seam from one side thereof, and a belt disposed to laterally contact the work-piece below such seam adjacent said device, said belt being adapted to carry a layer of flux sufficient to cover the corresponding side of such seam and inclining at varying angles with respect to the work-piece.

8. In a method of forming a welded seam confined between two juxtaposed metallic work-piece edges, the step which consists in simultaneously traversing the line of juncture between such edges with heating means applied to opposite sides of the seam to be formed, whereby such edges are fused, and so relating such heating means and the heat thereby provided as to intermingle the fused metal produced by each before solidification thereof.

9. In a method of forming a welded seam confined between two juxtaposed metallic work-piece edges, the step which consists in simultaneously traversing the line of juncture between such edges with heating means applied to opposite sides of the seam to be formed, whereby such edges are fused, and so relating such heating means and the heat thereby provided as to form a common pool of the fused metal produced by each.

10. In a method of forming a horizontally extending, laterally facing seam confined between two juxtaposed metal plate edges, the steps which comprise supporting a layer of fluxing material in overlying relation to such edges, the upper surface of such layer being exposed, and thereupon traversing the line of juncture between such edges with an electric arc substantially submerged in such layer, the mass of the latter being sufficient by its lateral pressure to retain the resulting molten weld-metal in place until solidified.

11. In a method of forming a horizontally extending, laterally facing seam confined between two juxtaposed metal plate edges, the steps which comprise supporting a layer of fluxing material in overlying relation to such edges, the upper surface of such layer being exposed, thereupon traversing the line of juncture between such edges with an electric arc substantially submerged in such layer, the mass of the latter being sufficient by its lateral pressure to retain the resulting molten weld-metal in place until solidified, and increasing such pressure as the welding operation proceeds.

12. In a method of forming a laterally facing seam confined between two juxtaposed metal plate edges, the steps which comprise supporting a layer of granular fluxing material in overlying relation to such edges on each of the opposite sides of said work-pieces, the upper surfaces of such layers being exposed, and thereupon simultaneously traversing the line of juncture between such edges with two electric arcs directed thereagainst from such opposite sides, such arcs being substantially submerged in the corresponding layers and the mass of the latter being sufficient by its lateral pressure to retain the resulting molten weld-metal in place until solidified.

13. In a method of forming a laterally facing seam confined between two juxtaposed metal plate edges, the steps which comprise supporting a layer of granular fluxing material in overlying relation to such edges on each of the opposite sides of said work-pieces, the upper surfaces of such layers being exposed, thereupon simultaneously traversing the line of juncture between such edges with two electric arcs directed thereagainst from such opposite sides, such arcs being substantially submerged in the corresponding layers and the mass of the latter being sufficient by its lateral pressure to retain the resulting molten weld-metal in place until solidified, and increasing such pressure as the welding operation proceeds by applying pressure externally of the layer.

14. In a method of forming a laterally facing seam confined between two juxtaposed metal plate edges, the steps which comprise supporting a layer of granular fluxing material in overlying relation to such edges on each of the opposite sides of said work-pieces, the upper surfaces of such layers being exposed, and thereupon simultaneously traversing the line of juncture between such edges with two electric arcs, one on each side of such line of juncture and respectively struck from metallic electrodes continuously fed through such exposed surface of the corresponding layer of fluxing material, the mass of the latter being sufficient by its lateral pressure to retain the resulting molten weld-metal in place until solidified.

15. In a method of forming a laterally facing seam confined between two juxtaposed metal plate edges, the steps which comprise supporting a layer of granular fluxing material in overlying relation to such edges on each of the opposite sides of said work-pieces, the upper surfaces of such layers being exposed, and thereupon simultaneously traversing the line of juncture between such edges with two electric arcs, one on each side of such line of juncture and respectively struck from metallic electrodes continuously fed through such exposed surface of the corresponding layer of fluxing material, said electrodes being thus fed in substantially opposed relation and the mass of such fluxing material being sufficient by its lateral pressure to retain the resulting molten weld-metal in place until solidified.

16. In a method of forming a laterally facing seam confined between two juxtaposed metal plate edges, the steps which comprise supporting a layer of granular fluxing material in overlying relation to such edges on each of the opposite sides of said work-pieces, the upper surfaces of such layers being exposed, and thereupon simultaneously traversing the line of juncture between such edges with two electric arcs directed thereagainst from such opposite sides, such arcs being substantially submerged in the corresponding layers and being respectively capable of fusing such edges to more than one-half the width thereof and the mass of such fluxing material being sufficient by its lateral pressure to retain the resulting molten weld-metal in place until solidified.

17. In mechanism for arc welding a horizontally extending, laterally facing seam confined between two juxtaposed metal plate edges, the combination with a support adapted to maintain the work-piece with such edges approximately in such horizontal position, one above the other, an electrode feeding device arranged and constructed to continuously feed metallic electrode toward such seam from one side thereof, said device being supported for relative movement longitudinally of such seam, a longitudinally extending belt adjacent said device having one edge of its upper run disposed to contact with the work-piece below such seam, and means adapted to drive said belt whereby said contacting edge thereof travels in unison with the relative movement between said device and work-piece, said belt being of such transverse extent as to support on such upper run thereof a layer of flux sufficient to cover the corresponding side of such seam while leaving the upper surface of the layer exposed to the passage of such electrode therethrough.

18. In mechanism for arc welding a horizontally extending, laterally facing seam confined between two juxtaposed metal plate edges, the combination with a support adapted to maintain the work-piece with such edges approximately in such horizontal position, one above the other, an electrode feeding device arranged and constructed to continuously feed metallic electrode toward such seam from one side thereof, said device being supported for relative movement longitudinally of such seam, a longitudinally extending belt adjacent said device having one edge of its upper run disposed to contact with the work-piece below such seam, and means adapted to drive said belt whereby said contacting edge thereof travels in unison with the relative movement between said device and work-piece, such upper run being transversely downwardly inclined toward such work-piece contacting edge and being of such transverse extent as to support on such upper run thereof a layer of flux sufficient to cover the corresponding side of such seam while leaving the upper surface of the layer exposed to the passage of such electrode therethrough.

VLADIMIR PETERS.

REFERENCES CITED

The following references are of record in the file of this patent:

UNITED STATES PATENTS

| Number | Name | Date |
| --- | --- | --- |
| 512,604 | Coffin | Jan. 9, 1894 |
| 1,371,094 | Holslag | Mar. 8, 1921 |
| 1,495,272 | Stresau | May 27, 1924 |
| 1,688,980 | Miller | Oct. 23, 1928 |
| 2,043,960 | Jones et al. | June 9, 1936 |
| 2,145,009 | Keir | Jan. 24, 1939 |
| 2,294,439 | Bagley | Sept. 1, 1942 |
| 2,401,722 | Clapp et al. | June 11, 1946 |
| 2,444,834 | Landis et al. | July 6, 1948 |

FOREIGN PATENTS

| Number | Country | Date |
| --- | --- | --- |
| 884,096 | France | Apr. 12, 1943 |

OTHER REFERENCES

"The Iron Age", September 27, 1945, pages 58 and 59.